Oct. 24, 1961  G. KLEMT  3,005,379
HIGH-SPEED GAUSSIAN DUAL OBJECTIVE
Filed Oct. 15, 1958
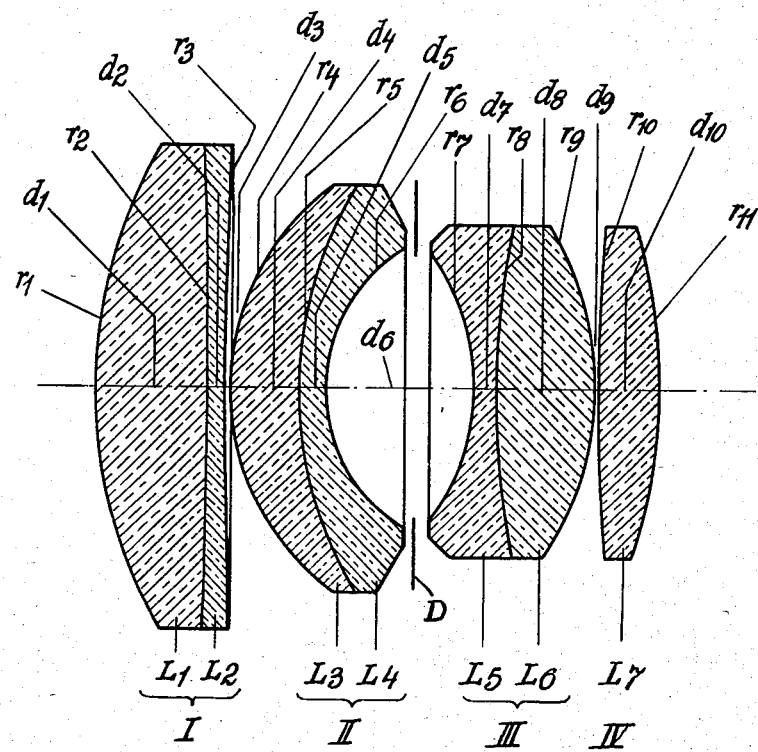
INVENTOR.
Günter KLEMT
BY
AGENT

United States Patent Office 3,005,379
Patented Oct. 24, 1961

3,005,379
HIGH-SPEED GAUSSIAN DUAL OBJECTIVE
Gunter Klemt, Kreuznach, Rhineland, Germany, assignor to Jos. Schneider & Co., Optische Werke, Kreuznach, Rhineland, Germany, a corporation of Germany
Filed Oct. 15, 1958, Ser. No. 767,464
Claims priority, application Germany Oct. 22, 1957
2 Claims. (Cl. 88—57)

My present invention relates to an optical system of the well-known Gaussian-dual-objective type, having four air-spaced lens members including an inner pair of meniscus-shaped dispersive members, turning their concave surfaces toward each other, and an outer pair of collective members bracketing the inner pair. A system of this general type is disclosed in U.S. Patent No. 2,683,398, issued July 13, 1954, to K. H. Macher and myself and owned by the assignee of the present application.

The general object of my present invention is to provide an improved photographic or cinematographic objective of this character which is capable of being designed with a larger aperture ratio while being fully corrected for spherical, chromatic, comatic and astigmatic abberations.

Attempts have previously been made to realize the desired improvement through the use of doublets for one or more of the lens members referred to above. The complexity of the laws governing the design of multi-lens objectives, however, prevented hitherto the discovery of a satisfactory formula for an objective of this type in which at least three of the four lens members are doublets.

I have found, in accordance with this invention, that a Gaussian dual objective of large aperture ratio can be obtained if each of the first three lens members, counting from the object side (side of the longer light rays) of the system, is a doublet whose cemented surface exerts a dispersive effect upon the incoming light rays. More particularly, in a preferred embodiment, the first member is composed of a biconvex lens of lower refractive index cemented onto a biconcave lens of higher refractive index, the difference in the refractive indices ranging between 0.008 and 0.02; the cemented surfaces of the second and third members are convex toward the object side of the system, with the refractive index decreasing at each of these surfaces by a value ranging between 0.04 and 0.06 for the second doublet and between 0.008 and 0.02 for the third doublet. The fourth member, on the image side of the system, is preferably a simple lens.

Such systems can be made with an aperture ratio as high as 1:1.4; the use of highly refractive glasses throughout, e.g. of a refractive index $n_d$ greater than 1.6, insures maximum elimination of spherical zonal aberrations.

The sole figure of the accompanying drawing illustrates the preferred embodiment.

In the drawing, two inner, dispersive lens members II, III define with their concave sides a diaphragm spaced $d_6$ and are in turn bracketed by two outer, collective lens members I, IV. The first member I is a doublet composed of a biconvex lens $L_1$ having radii $r_1$, $r_2$ and a thickness $d_1$; it is cemented onto a biconcave lens $L_2$ with radii $r_2$, $r_3$ and thickness $d_2$. Member II, separated from member I by an air space $d_3$, is a doublet composed of a positive meniscus $L_3$ (radii $r_4$, $r_5$ and thickness $d_4$) cemented onto a negative meniscus $L_4$ (radii $r_5$, $r_6$ and thickness $d_5$). Beyond diaphragm spaced $d_6$, member III is a meniscus-shaped doublet consisting of a biconcave lens $L_5$ (radii $r_7$, $r_8$ and thickness $d_7$) cemented onto a biconvex lens $L_6$ (radii $r_8$, $r_9$ and thickness $d_8$). Separated from member III by an air space $d_9$ is member IV, consisting of a single lens $L_7$ having radii $r_{10}$, $r_{11}$ and thickness $d_{10}$.

Numerical values of the radii, thicknesses and air spacings of lenses $L_1$–$L_7$, based upon a numerical value of 100 for the overall focal length of the system, as well as for the refractive indices $n_d$ and the Abbé numbers $v$ thereof are given in the following Tables A and B, representing objectives of the same aperture ratio (1:1.4) but different back-focal lengths.

TABLE A
[Back-focal length $s' = 57.99$]

| Lens | | Radii | Thicknesses and Air Spacings | $n_d$ | $v$ |
|---|---|---|---|---|---|
| I | $L_1$ | $r_1 = +73.99$ | $d_1 = 18.24$ | 1.6779 | 55.5 |
| | $L_2$ | $r_2 = -456.90$ | $d_2 = 3.01$ | 1.6889 | 31.2 |
| | | $r_3 = +296.75$ | $d_3 = 0.32$ | air space | |
| II | $L_3$ | $r_4 = +38.38$ | $d_4 = 10.94$ | 1.6700 | 47.2 |
| | $L_4$ | $r_5 = +60.52$ | $d_5 = 4.49$ | 1.6166 | 36.6 |
| | | $r_6 = +25.33$ | $d_6 = 23.21$ | diaphragm space | |
| III | $L_5$ | $r_7 = -34.69$ | $d_7 = 3.61$ | 1.6727 | 32.2 |
| | $L_6$ | $r_8 = +126.21$ | $d_8 = 15.43$ | 1.6583 | 57.3 |
| | | $r_9 = -49.54$ | $d_9 = 0.32$ | air space | |
| IV | $L_7$ | $r_{10} = +214.42$ | $d_{10} = 9.50$ | 1.7440 | 44.9 |
| | | $r_{11} = -85.21$ | | | |
| | | | $d_{total} = 89.07$ | | |

TABLE B
[Back-focal length $s' = 54.23$]

| Lens | | Radii | Thicknesses and Air Spacings | $n_d$ | $v$ |
|---|---|---|---|---|---|
| I | $L_1$ | $r_1 = +73.99$ | $d_1 = 18.24$ | 1.6779 | 55.5 |
| | $L_2$ | $r_2 = -456.90$ | $d_2 = 3.01$ | 1.6889 | 31.2 |
| | | $r_3 = +296.75$ | $d_3 = 4.01$ | air space | |
| II | $L_3$ | $r_4 = +38.38$ | $d_4 = 10.94$ | 1.6700 | 47.2 |
| | $L_4$ | $r_5 = +60.52$ | $d_5 = 4.49$ | 1.6166 | 36.6 |
| | | $r_6 = +25.33$ | $d_6 = 26.93$ | diaphragm space | |
| III | $L_5$ | $r_7 = -35.13$ | $d_7 = 3.21$ | 1.6727 | 32.2 |
| | $L_6$ | $r_8 = +126.21$ | $d_8 = 15.43$ | 1.6583 | 57.3 |
| | | $r_9 = -49.54$ | $d_9 = 0.32$ | air space | |
| IV | $L_7$ | $r_{10} = +214.42$ | $d_{10} = 9.50$ | 1.7440 | 44.9 |
| | | $r_{11} = -85.21$ | | | |
| | | | $d_{total} = 96.08$ | | |

As will be apparent from the numerical values given above, each of the cemented surfaces $r_2$, $r_5$ and $r_8$ is dispersive to incoming light rays inasmuch as the refractive index increases across such surface if it is forwardly concave ($r_2$) and decreases if the surface is forwardly convex ($r_5$, $r_8$). The difference between the refractive indices across surfaces $r_2$ and $r_8$ is in both examples 0.011 and 0.015, respectively, ranging thus between 0.008 and 0.02, while that across surface $r_5$ is in each case equal to 0.053 so as to lie between the limiting values of 0.04 and 0.06.

In the accompanying claims, the terms "front" and "object side" designate the side of the longer light rays whereas the terms "rear" and "image side" designate the side of the shorter light rays.

I claim:
1. An optical system comprising a Gaussian dual ob- jective with four air-spaced lens members including a first doublet on the object side of the system composed of a biconvex front lens and a biconcave rear lens, a second doublet following said first doublet composed of a positive front meniscus and a negative rear meniscus, a third doublet separated from said second doublet by a diaphragm space, said third doublet being composed of a biconcave front lens and a biconvex rear lens, and a biconvex single lens following said third doublet on the image side of the system, each of said doublets having a cemented surface which is dispersive for the light rays impinging from said object side, said biconvex front lens $L_1$, said biconcave rear lens $L_2$, said positive front meniscus $L_3$, said negative rear meniscus $L_4$, said biconcave front lens $L_5$, said biconvex rear lens $L_6$, and said biconvex single lens $L_7$ having radii $r_1$ to $r_{11}$ and thicknesses and air spaces $d_1$ to $d_{10}$ whose numerical values, based upon a numerical value of 100 for the overall focal length of the system, together with the values of their refractive indices $n_d$ and their Abbé numbers $v$ are substantially as given in the following table:

| Lens | Radii | Thicknesses and Air Spacings | $n_d$ | $v$ |
|---|---|---|---|---|
| $L_1$ | $r_1 = +73.99$ | $d_1 = 18.24$ | 1.6779 | 55.5 |
|  | $r_2 = -456.90$ | $d_2 = 3.01$ | 1.6889 | 31.2 |
| $L_2$ | $r_3 = +296.75$ | $d_3 = 0.32$ | air space | |
| $L_3$ | $r_4 = +38.38$ | $d_4 = 10.94$ | 1.6700 | 47.2 |
|  | $r_5 = +60.52$ | $d_5 = 4.49$ | 1.6166 | 36.6 |
| $L_4$ | $r_6 = +25.33$ | $d_6 = 23.21$ | diaphragm space | |
|  | $r_7 = -34.69$ | $d_7 = 3.61$ | 1.6727 | 32.2 |
| $L_5$ | $r_8 = +126.21$ | $d_8 = 15.43$ | 1.6583 | 57.3 |
| $L_6$ | $r_9 = -49.54$ | $d_9 = 0.32$ | air space | |
| $L_7$ | $r_{10} = +214.42$ | $d_{10} = 9.50$ | 1.7440 | 44.9 |
|  | $r_{11} = -85.21$ |  |  |  |

2. An optical system comprising a Gaussian dual objective with four air-spaced lens members including a first doublet on the object side of the system composed of a biconvex front lens and a biconcave rear lens, a second doublet following said first doublet composed of a positive front meniscus and a negative rear meniscus, a third doublet separated from said second doublet by a diaphragm space, said third doublet being composed of a biconcave front lens and a biconvex rear lens, and a biconvex single lens following said third doublet on the image side of the system, each of said doublets having a cemented surface which is dispersive for light rays impinging from said object side, said biconvex front lens $L_1$, said biconcave rear lens $L_2$, said positive front meniscus $L_3$, said negative rear meniscus $L_4$, said biconcave front lens $L_5$, said biconvex rear lens $L_6$, and said biconvex single lens $L_7$ having radii $r_1$ to $r_{11}$ and thicknesses and air spaces $d_1$ to $d_{10}$ whose numerical values, based upon a numerical value of 100 for the overall focal length of the system, together with the values of their refractive indices $n_d$ and their Abbé numbers $v$ are substantially as given in the following table:

| Lens | Radii | Thicknesses and Air Spacings | $n_d$ | $v$ |
|---|---|---|---|---|
| $L_1$ | $r_1 = +73.99$ | $d_1 = 18.24$ | 1.6779 | 55.5 |
|  | $r_2 = -456.90$ | $d_2 = 3.01$ | 1.6889 | 31.2 |
| $L_2$ | $r_3 = +296.75$ | $d_3 = 4.01$ | air space | |
| $L_3$ | $r_4 = +38.38$ | $d_4 = 10.94$ | 1.6700 | 47.2 |
|  | $r_5 = +60.52$ | $d_5 = 4.49$ | 1.6166 | 36.6 |
| $L_4$ | $r_6 = +25.33$ | $d_6 = 26.93$ | diaphragm space | |
|  | $r_7 = -35.13$ | $d_7 = 3.21$ | 1.6727 | 32.2 |
| $L_5$ | $r_8 = +126.21$ | $d_8 = 15.43$ | 1.6583 | 57.3 |
| $L_6$ | $r_9 = -49.54$ | $d_9 = 0.32$ | air space | |
| $L_7$ | $r_{10} = +214.42$ | $d_{10} = 9.50$ | 1.7440 | 44.9 |
|  | $r_{11} = -85.21$ |  |  |  |

References Cited in the file of this patent

UNITED STATES PATENTS

| 2,117,252 | Lee | May 10, 1938 |
| 2,262,985 | Aklin | Nov. 18, 1941 |
| 2,262,998 | Frederick et al. | Nov. 18, 1941 |
| 2,600,207 | Cook | June 10, 1952 |
| 2,683,398 | Klemt et al. | July 13, 1954 |

FOREIGN PATENTS

| 376,044 | Great Britain | July 7, 1932 |
| 685,572 | Germany | Dec. 20, 1939 |
| 678,838 | Great Britain | Sept. 10, 1952 |
| 769,348 | France | June 5, 1934 |